United States Patent
McGrail et al.

(10) Patent No.: US 6,372,846 B1
(45) Date of Patent: Apr. 16, 2002

(54) POLYMER COMPOSITION

(75) Inventors: Patrick Terence McGrail; Stephen Derek Jenkins; Christopher Ian Lindsay; Gordon Thomas Emmerson, all of Cleveland (GB)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/508,241

(22) PCT Filed: Sep. 8, 1998

(86) PCT No.: PCT/GB98/02703

§ 371 Date: Nov. 6, 2000

§ 102(e) Date: Nov. 6, 2000

(87) PCT Pub. No.: WO99/12986

PCT Pub. Date: Mar. 18, 1999

(30) Foreign Application Priority Data

Sep. 9, 1997 (GB) .............................................. 9719060

(51) Int. Cl.[7] .............................. C08F 8/00; C08L 9/00; C08L 23/00; C08L 33/04; C08L 35/02
(52) U.S. Cl. ...................... 525/191; 525/192; 525/193; 525/222; 525/232; 525/240
(58) Field of Search ................................. 525/191, 192, 525/193, 222, 232, 240

(56) References Cited

U.S. PATENT DOCUMENTS

| 3,178,489 A | 4/1965 | Lunk |
| 3,267,178 A | 8/1966 | Lee |
| 4,080,406 A | 3/1978 | Kelsey |

FOREIGN PATENT DOCUMENTS

| EP | 0 014 574 | 8/1980 |

Primary Examiner—Nathan M. Nutter
(74) Attorney, Agent, or Firm—Jane E. Gennaro

(57) ABSTRACT

A polymer composition, a process for its preparation and a molded article formed from the polymer composition are claimed. The polymer composition comprises (a) a base polymer that is a poly(alkyl(meth)acrylate; and (b) a rubber toughening agent selected from the group consisting of (i) copolymers of (alkyl)acrylate rubbers, (ii) copolymers of vinyl aromatic monomers with (alkyl)acrylates, (iii) copolymers of vinyl aromatic monomers with conjugated diolefins; (iv) copolymers of vinyl aromatic monomers with monoethylenically unsaturated monomers, in which the rubber toughening agent is present in the polymer composition as discrete islands substantially surrounded by the base polymer and in which islands are sub-islands of the base polymer.

19 Claims, 2 Drawing Sheets

Print Magnification 10,000

Print Magnification : 10,000

Print Magnification 10,000

POLYMER COMPOSITION

This application is the national phase of international application PCT/GB98/02703 filed Sep. 8, 1998 which designated the U.S.

The present invention relates to a polymer composition, in particular a composition comprising a base polymer which is a poly(alkyl(meth)acrylate) and a rubber toughening agent.

Base polymer such as a poly(alkyl(meth)acrylate), e.g. poly(methyl methacrylate), known as PMMA, can be a relatively brittle material. This detracts from its use in certain applications, e.g. external light clusters for automotive vehicles, where properties such as impact resistance are important. Conventionally, the properties of the base polymer can be improved by the addition of comonomers during its production and/or by the addition of toughening agents. Typically, the toughening agents are small particles having a core-shell structure, e.g. as disclosed in GB-A-2039496. The toughening agents are added as pre-made particles which are then compounded with the base polymer. Such toughening agents are prepared using emulsion phase polymerisation in which each layer is sequentially polymerised one on another. Consequently, due to the complexity of the core-shell manufacturing process, the base polymer so toughened is relatively expensive and is primarily confined for use in specialised applications.

Certain rubber toughening agents are used to improve the properties of polystyrene. EP-0818481-A2 describes a process for the manufacture of high impact polystyrene (HIPS) materials using low shear mechanical agitation such that the product produced contains large particle sizes of a rubber-like composite phase up to 12 micron for shear rates all lower than 50 rpm. These particle sizes are retained when this polymeric mixture is further extruded into an article.

It has now been found that base polymer such as a poly(alkyl(meth)acrylate) as previously described can be toughened by the addition of certain rubber toughening agents which are added during the production of the base polymer. The polymer composition so formed has improved impact resistance compared to that of the base polymer and has a unique morphology.

Accordingly, in a first aspect, the present invention provides a polymer composition comprising
(a) a base polymer which is a poly(alkyl(meth)acrylate); and
(b) a rubber toughening agent selected from the group consisting of
   (i) copolymers of (alkyl)acrylate rubbers
   (ii) copolymers of vinyl aromatic monomers with (alkyl)acrylates
   (iii) copolymers of vinyl aromatic monomers with conjugated diolefins
   (iv) copolymers of vinyl aromatic monomers with monoethylenically unsaturated monomers
wherein the rubber toughening agent is present in the polymer composition as discrete islands substantially surrounded by the base polymer and in which islands are sub-islands of the base polymer.

In a second aspect the present invention provides a process for the preparation of a polymer composition comprising
(a) a base polymer which is a poly(alkyl(meth)acrylate); and
(b) a rubber toughening agent selected from the group consisting of
   (i) copolymers of (alkyl)acrylate rubbers
   (ii) copolymers of vinyl aromatic monomers with (alkyl)acrylates
   (iii) copolymers of vinyl aromatic monomers with conjugated diolefins
   (iv) copolymers of vinyl aromatic monomers with monoethylenically unsaturated monomers
wherein the rubber toughening agent is present in the polymer composition as discrete islands substantially surrounded by the base polymer and in which islands are sub-islands of the base polymer which process comprises dissolving the rubber toughening agent in a monomer composition from which the base polymer is to be formed to form a solution, polymerising the monomer composition to form the base polymer and thereby causing the rubber toughening agent to come out of solution so as to form islands within the polymer composition in which are included sub-islands of the base polymer.

In a third aspect the present invention provides a moulded article formed from a polymer composition comprising
(a) a base polymer which is a poly(alkyl(meth)acrylate); and
(b) a rubber toughening agent selected from the group consisting of
   (i) copolymers of (alkyl)acrylate rubbers
   (ii) copolymers of vinyl aromatic monomers with (alkyl)acrylates
   (iii) copolymers of vinyl aromatic monomers with conjugated diolefins
   (iv) copolymers of vinyl aromatic monomers with monoethylenically unsaturated monomers
wherein the rubber toughening agent is present in the polymer composition as discrete islands substantially surrounded by the base polymer and in which islands are sub-islands of the base polymer.

For the rubber toughening agent (i) copolymers of (alkyl) acrylate rubbers and (ii) copolymers of vinyl aromatic monomers with (alkyl)acrylates include both saturated and unsaturated copolymers.

The base polymer may be a homopolymer or a copolymer. Preferably the base polymer contains an alkyl methacrylate, such as a $C_1$–$C_4$ alkyl methacrylate, e.g. methyl methacrylate. Particularly preferred is when the base polymer is a copolymer of such an alkyl methacrylate and an alkyl acrylate, such as a $C_1$–$C_4$ alkyl acrylate, e.g. ethyl acrylate.

The rubber toughening agent may be selected from a wide variety of commercially available and other copolymers. Suitable copolymers of vinyl aromatic monomers with (alkyl)acrylates include styrene-butyl acrylate (St-BA) and styrene-lauryl methacrylate (St-LMA) rubbers, preferably incorporating allyl unsaturation. Examples of monomers that can provide allyl unsaturation include allyl methacrylate (AMA) and glycidyl methacrylate (GMA) Suitable copolymers of (alkyl)acrylate rubbers include benzyl methacrylate-lauryl methacrylate (BzMA-LMA) rubber also preferably incorporating allyl unsaturation. Suitable copolymers of vinyl aromatic monomers with conjugated diolefins include styrene-butadiene rubbers such as Nipol NS210., polystyrene-polybutadiene block copolymers such as Cariflex 1184, S1509, S1013. Suitable copolymers of vinyl aromatic monomers with monoethylenically unsaturated monomers include styrene ethylene butylene styrene (SEBS) copolymer.

It is preferred that the rubber toughening agent contains at least some degree of unsaturation, for example where the rubber toughening agent is a styrene-butylacrylate rubber it is preferred that the level of allyl unsaturation is from 1.5 to 5.0% (on a molar basis), particularly from 1.5 to 4.5%, and especially about 2%. Where the rubber toughening agent is selected from saturated rubbers such as styrene-butyl acrylate (St-BA), styrene-lauryl methacrylate (St-LMA) and benzyl methacrylate-lauryl methacrylate (BzMA-LMA) rubbers we find that less of the rubber toughening agent is present in the desired island/sub-island morphology whilst a proportion is present in the form of discreet, separate phase.

The islands of rubber toughening agent are generally circular in cross section and typically up to very large average particle sizes of 250 microns or less in diameter, for example from 10 to 100 microns in diameter. However, where the optical properties of the polymer composition are especially important small diameter islands, e.g. from 2 to 5 microns, are desirable. Therefore it is surprising that when an unsaturated styrene-laurylmethacrylate rubber is used even with islands of up to 10 microns in size the optical properties of the polymer composition remain acceptable whereas a comparable polymer composition containing an unsaturated styrene-butylacrylate rubber is translucent and hazy.

Typically, the rubber toughening agent represents from 1 to 20% preferably from 1 to 10% by weight of the polymer composition. More preferably, the rubber toughening agent represents from 2 to 6% by weight of the polymer composition and in particular about 4%, for example 96% by weight of a base polymer containing methyl methacrylate and with 4% by weight of a styrene-butadiene rubber.

The polymer composition is prepared by dissolving the rubber toughening agent in a monomer composition from which the base polymer is to be formed, for example a mixture of methyl methacrylate and ethyl acrylate, so as to form a solution. The preparation of the solution may be assisted with stirring or agitation and is usually conducted at room temperature. Polymerisation of the monomer composition is then carried out using conventional bulk polymerisation techniques, for example by the addition of suitable initiators such as lauroyl peroxide and chain transfer agents such as lauryl mercaptan. Preferably the temperature under which the polymerisation is conducted is controlled. Additionally, at least during the initial stages of the polymerisation, e.g. up until about 50%, and preferably up until about 35%, of the monomer composition has been polymerised, a high level of shear may be applied, for example between 100 and 250 rpm, for example about 170 rpm. However it is preferred that the polymerisation of the monomer composition is undertaken without stirring.

Alternative polymerisation routes, e.g. by solvent, are not known to give rise to the desired morphology.

The polymer compositions of the present invention can be compression moulded or processed in other conventional ways to form articles having improved impact resistance. In such articles the desired morphology is still apparent although the size of the islands may change. Surprisingly, in some cases, it was found that the particle size of the islands of rubber toughening agent were greatly reduced when the polymer compositions were further processed, for example extruded or injection moulded. For example average particle sizes were found to be reduced from tens of microns to less than 5, particularly 0.01 to 3 micron and especially 0.1 to 1 micron, for example 0.1 to 0.5 micron. Even more surprisingly the extruded or injection moulded articles were found to have properties at least equivalent to the corresponding polymer compositions with much larger particle sizes. In some instances the properties of these moulded articles were found to be enhanced as compared to the polymer compositions.

The polymer compositions as herein described may also contain conventional additives including other modifiers such as the previously described core-shell particles which may then be added at lower than usual levels to achieve the same improved properties.

The present invention is illustrated by reference to the following diagram.

Figure 1:
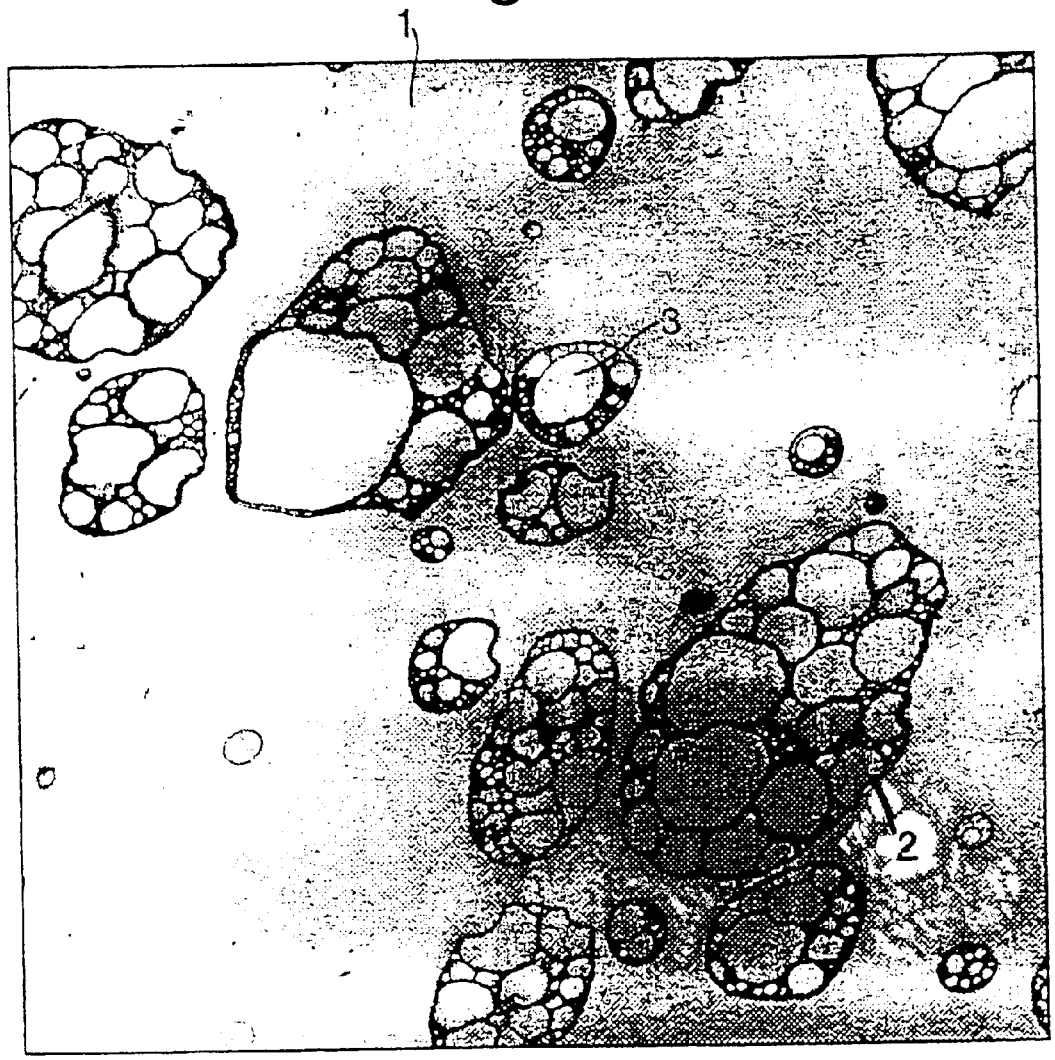
FIG. 1 is a Transmission Electron Micrograph (TEM) of a section through a polymer composition of PMMA (96%) with styrene-butadiene (4%) which has been produced with shearing at 170 rpm during the initial stage of polymerisation and which shows the desired morphology. The base polymer (1) has discrete islands of rubber toughening agent (2) which contain sub-islands of base polymer (3).
Figure 2:
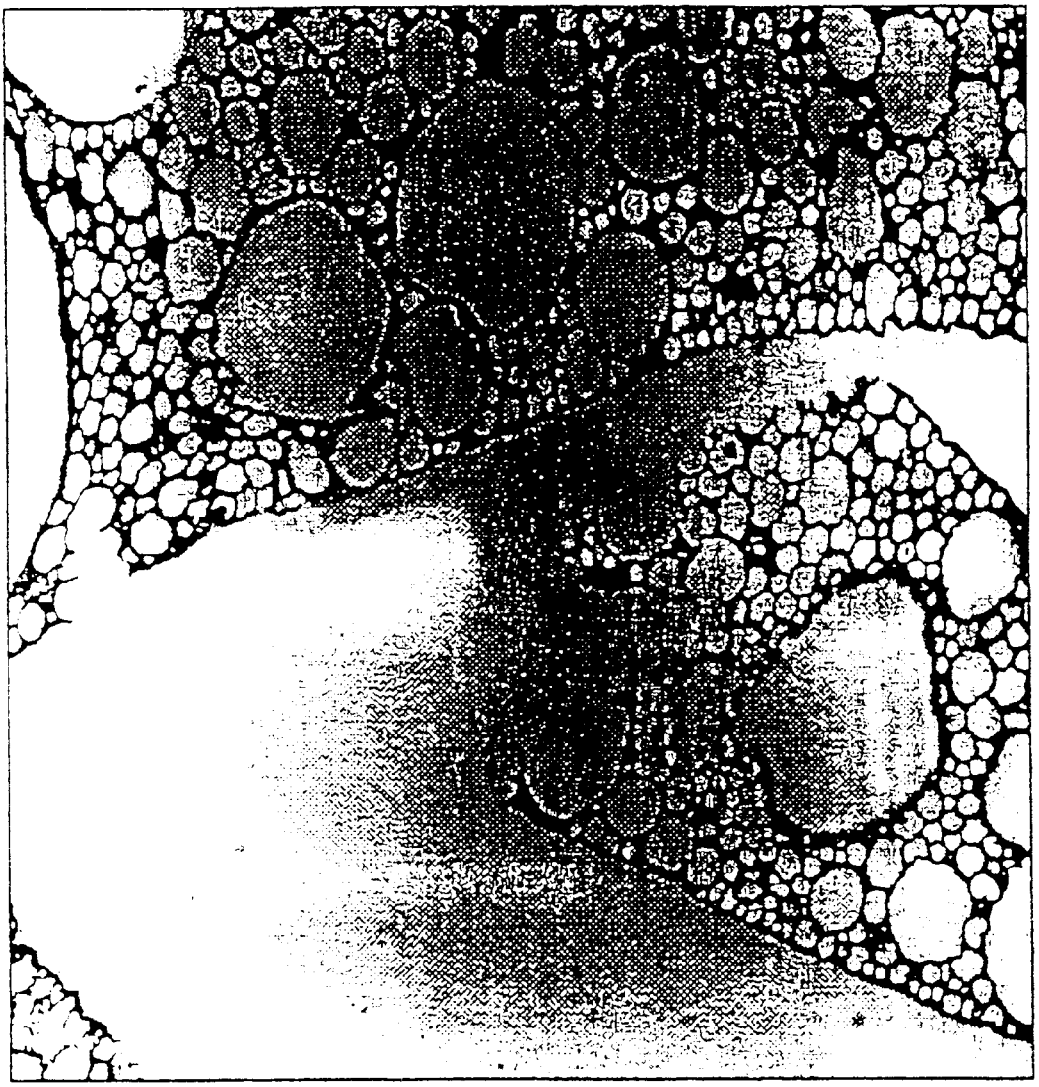
FIG. 2 is a TEM of a section through a polymer composition of the same composition as used in FIG. 1 but which has not been sheared during the initial stage of polymerisation.

The present invention is further illustrated by reference to the following examples.

EXAMPLE 1

Preparation of Saturated Poly(alkyl)acrylate Rubber Toughening Agents

In addition to the commercially available rubber toughening agents identified a number of saturated rubbers were synthesised from the following monomer combinations in order to give a close match to the refractive index (Ref Ind) of the base polymer and also to provide a rubber toughening agent that had the requisite solubility characteristics, i.e. soluble in the monomer composition but insoluble in the polymer composition. MONOMER 1 CHOSEN FROM Styrene (St), Benzyl methacrylate (BZMA) MONOMER 2 CHOSEN FROM Lauryl methacrylate (LMA), Stearyl Methacrylate (SMA), Butyl Acrylate (BA)

The copolymers were prepared via radical polymerisation in toluene with 2,2-azobisisobutyronitrile (AIBN) initiator at 80° C. to give polymers $M_n$=ca. 7–8 K.

The St-LMA and BzMA-LMA copolymers were shown by NMR to be random with little evidence of compositional drift. The target compositions were those predicted to give a refractive index match with a base polymer of Polymethylmethacrylate and it can be seen that, whilst St-LMA (II) and BzMA-LMA deviate a little from this, the desired refractive index was achieved for St-LMA (I).

The glass transition temperatures ($T_g$) of the copolymers (measured by Differential Scanning Calorimetry (DSC)) show a negative deviation from those predicted from the homopolymer Tgs of polystyrene (95), polylaurylmethacrylate (−64) and polybenzylmethacrylate (54).

| Copolymer | Target Composition | Actual Composition (NMR) | $T_g$ (° C.) | $M_n/10^3$ | $M_w/10^3$ | $M_w/M_n$ | Refractive Index |
|---|---|---|---|---|---|---|---|
| St-LMA(I) | 19.1% St | 19.1% St | −74 | 35 | 72 | 2.1 | 1.5 |
| St-LMA(II) | 19.1% St | 16.1% St | −74 | 109 | 249 | 2.3 | 1.5 |
| BzMA-LMA | 15.8% BzMA | 21.9% BzMA | −72 | 39 | 61 | 1.95 | 1.49 |
| St-BA | | 26.3% St | −25 | 20 | 33 | 2.2 | 1.5 |

EXAMPLE 2
Preparation of Unsaturated Poly(alkyl)acrylate Rubber Toughening Agents In a similar manner to the above synthesised saturated rubber toughening agents, styrene-butyl acrylate-allyl methacrylate (St-BA-AMA; I–III) and styrene-lauryl methacrylate-allyl methacrylate (St-LMA-AMA; IV & V) rubbers were synthesised via radical polymerisation of 50 wt % monomer solutions in toluene using AIBN as the initiator.

The level of allyl methacrylate incorporation and molecular weight control in the St-BA-AMA rubbers was limited by the formation of insoluble gels at levels of AMA in the monomer feed higher than 2–3 wt % or concentrations of AIBN higher than ca. 0.1 wt % based on the monomer feed.

A styrene-butyl acrylate rubber incorporating ca. 2% unsaturated methacrylate groups (VI) was synthesised by copolymerising styrene, butyl acrylate and methacrylic acid (2%) and then reacting the carboxylic acid functionality with glycidyl methacrylate (GMA) to generate pendant methacrylic unsaturation.

The compositions (expressed in wt %) and properties of the above identified unsaturated rubbers are presented in the following table.

| Code | St | BA | LMA | AMA | GMA | $T_g$ (° C.) | $M_n$ | $M_w$ | $M_w/M_n$ | Ref Ind |
|---|---|---|---|---|---|---|---|---|---|---|
| I | 28.7 | 70.5 | | 1.1 | | −23 | 233 | 666 | 2.86 | 1.51 |
| II | 29.1 | 68.6 | | 2.3 | | −19 | 145 | 818 | 5.64 | 1.5 |
| III | 23.9 | 71 | | 2.2 | | −33 | 173 | 822 | 4.75 | 1.49 |
| IV | 13.2 | | 86.2 | 0.6 | | −74 | 159 | 389 | 2.45 | 1.49 |
| V | 14.5 | | 83.7 | 1.8 | | −69 | 311 | 822 | 2.64 | 1.5 |
| VI | 13.4 | 84.6 | | | 2 | −44 | 236 | 99 | 2.38 | |

The $T_g$s of the styrene-butyl acrylate rubbers are generally between ca. −15 & −45° C., dependent upon the level of styrene incorporation, whereas the $T_g$s of the styrene-lauryl methacrylate rubbers are generally ca. −70° C.

The refractive indices of the St-BA-AMA rubbers I & II are higher than the desired target of ca. 1.49 (i.e. the refractive index of PMMA) as a consequence of their high styrene contents whereas those of the St-LMA-AMA copolymers IV & V are closer to the target value.

EXAMPLE 3
Preparation of Polymer Compositions Using Saturated Rubber Toughening Agents from Example 1

The following route was used to prepare the polymer compositions unless otherwise stated.

St-LMA rubber was dissolved in a mixture of methyl methacrylate: ethyl acrylate (96:4) (herein referred to as PMMA) with stirring or agitation at room temperature. Bulk polymerisation was then carried out, with no shearing, between glass plates using lauroyl peroxide (0.3 wt %) as the initiator, lauryl mercaptan (0.45 wt %) as the chain transfer agent and employing the following temperature programme to form a cast plaque of 4–6 mm thickness:

| 60° C. | 20 hours |
|---|---|
| 80° C. | 1.5 hours |
| 100° C. | 2 hours |
| 130° C. | 2 hours |

The cast plaque was then broken up and compression-moulded at 200° C. to produce test-pieces, of 3.2 to 4 mm thickness, suitable for physical property assessment.

For the polymer composition gross phase separation was observed which resulted in some of the desired morphology being present.

EXAMPLE 4
Preparation of Polymer Compositions Using Saturated Rubber Toughening Agents from Example 1

The method of preparation was the same as in Example 3 except for the application of shearing during polymerisation (defined as stirring at 170 rpm during the early stages of polymerisation (i.e. <30% monomer conversion)). Polymer compositions of PMMA with St-LMA(II) and BzMA-LMA (4% by wt) did not result in gross phase separation. Mouldings of the polymer compositions were hazy but translucent. The TEM of the PMMA/(4%) (BzMA-LMA) rubber showed that a very irregular morphology existed with some islands containing sub-islands of PMMA but with many islands incorporating no sub-islands and of small size. Solubility tests, i.e. immersing a 1 g cutting from a plaque in tetrahydrofuran (15 ml) with vigorous agitation for 2 days, showed that no cross-linking was present in these polymer compositions.

EXAMPLE 5
Preparation of Polymer Compositions Using Unsaturated Rubber Toughening Agents from Example 2

Following the preparation methods in Examples 4 and 3 polymer compositions of PMMA with the unsaturated rubbers I–VI were produced both with and without the application of shearing respectively and were subsequently compression moulded. TEMs of the compression-mouldings of PMMA/rubber showed the desired island/sub-island morphology both with and without shear during polymerisation. With the application of shear the islands were between 0.5–10 microns in diameter.

The optical properties and solubility characteristics of the compression-moulded cast blends are summarised in the following table.

| Rubber | Rubber % wt in Polymer Composition | Shear @ 170 rpm | Moulding Appearance |
|---|---|---|---|
| I | 4 | Yes | Translucent |
| I | 8 | Yes | Translucent |
| II | 4 | Yes | Translucent |
| II | 4 | No | Translucent |
| III | 2 | Yes | Translucent |
| IV | 4 | Yes | Transparent |
| V | 4 | No | Transparent |
| VI | 4 | No | Transparent |

The polymer compositions were subjected to solubility tests which indicated a level of gel formation and hence that the allyl methacrylate or glycidyl methacrylate within the rubber had induced cross-linking within the separated phase. This contrasts with the absence of gel formation in polymer compositions of PMMA with saturated rubbers.

At room temperature, polymer compositions of PMMA with St-BA-AMA are hazy whilst those with St-LMA-AMA were transparent. However, the converse was true at elevated temperatures.

EXAMPLE 6
Preparation of Polymer Compositions Using Commercial Rubber Toughening Agents A polymer composition of PMMA with 4% of Nipol NS210, a styrene-butadiene rubber (25:75) available from Zeon Chemicals, was produced by the methods described in Examples 3 and 4. The PMMA molecular weight characteristics were $M_n$=260,000, $M_w$=330,000 and $M_w/M_n$=1.3 as measured by Gel Permeation Chromatography (GPC) of a PMMA control. The TEMs of the polymer composition showed the desired island/sub-island morphology wherein the islands had very large diameters, typically greater than 100 microns under polymerisation in non-shear conditions. Particle size was measured by visual inspection of the TEMs.

EXAMPLE 7
Preparation of Polymer Compositions Using Commercial Rubber Toughening Agents Kraton FG1901X, a SEBS rubber incorporating a small amount of succinic anhydride, provided polymer compositions, following the method in Example 3, which had the desired island/sub-island morphology but wherein the islands were of generally smaller diameter and contained less of the PMMA as sub-islands.

EXAMPLE 8
Preparation of Polymer Compositions Using Commercial Rubber Toughening Agents Cariflex 1184, from Shell, a polystyrene-polybutadiene block copolymer (30:70) also provided a polymer composition, following the method in Examples 3 and 4, of the desired morphology.

EXAMPLE 9
Mechanical Properties of the Polymer Compositions

The mechanical properties of the various polymer compositions prepared in Examples 3 to 8 above are summarised in the Tables below. Unnotched Charpy impact strength (1 m/s) was measured according to ISO 179 using an instrumented falling weight apparatus. Linear elastic fracture mechanics measurements ($K_{1c}$ and ductility factor) were carried out using an instrumented falling weight apparatus at impact rate 1 m/s on single edge notched beam samples in a three-point bending geometry. Flexural modulus was measured according to ISO 178 at 1 mm/min.

| | Unnotched Charpy (kJ/m$^2$) | $K_{1c}$ (MN$^{-3/2}$) 1 m/s | Ductility Factor (mm) 1 m/s | Flexural Modulus (GPa) |
|---|---|---|---|---|
| Commercial Rubber | | | | |
| PMMA control | 11 | 1.6 | 0.12 | 3 |
| Nipol NS210 (4% - no shear) | 26 | 2.6 | 0.6 | 1.4 |
| Nipol NS210 (4% - shear) | 38 | 3.1 | 1.02 | 1.8 |
| Nipol NS210 (8% - shear) | 23 | 1.8 | 0.41 | 0.5 |
| Kraton FG1901X (4% - no shear) | 16 | | | 3.1 |
| Cariflex 1184 (4% - no shear) | 8 | 2.1 | 0.41 | |
| Cariflex 1184 (4% - shear) | 23 | 2.4 | 0.52 | |
| Synthesised Rubber | | | | |
| St-BA-AMA (1%) (4% - shear) | 5.9 | 2.5 | 0.41 | 2.4 |
| St-BA-AMA (2%) (4% - shear) | 19 | 2.3 | 0.4 | 2.3 |
| St-BA-AMA (1%) (8% - shear) | 5.5 | | 0.49 | |
| Sty-BA (8% - shear) | | | 0.54 | |
| St-LMA (4% - shear) | 4.5 | | | |
| St-LMA-AMA (1%) (4% - shear) | 11 | | | 2.4 |

The above results show improved properties of the PMMA/rubber blends compared to PMMA for PMMA/rubber blends prepared both with and without stirring. For Cariflex 1184 the apparent lack of improvement in unnotched Charpy impact strength compared to PMMA for the blend prepared without stirring is thought to be because of the difficulty of dissolving this rubber in the monomeric matrix prior to polymerisation.

EXAMPLE 10

Post Processing of the Polymer Compositions

A polymer composition of PMMA with Nipol NS210 (4%) was prepared on a semi-technical scale. The polymer composition was extruded using a Haaka extruder at a screw speed of 100 rpm with the temperatures of the barrel sections as follows:

| Barrel Section | 1 | 2 | 3 | 4 |
|---|---|---|---|---|
| Temperature (° C.) | 60 | 180 | 220 | 230 |

The table below shows the mechanical properties of this composition compared with PMMA only.

| Composition | Unnotched Charpy (kJ/m$^2$) | $K_{1c}$ at 1 m/s (kJ/m$^2$) | Ductility Factor at 1 m/s (mm) | Rubber Island Diameter (microns) |
|---|---|---|---|---|
| PMMA/rubber blend | 36.8 | 3.89 | 1.32 | 0.1–0.5 |
| PMMA comparative | 11 | 1.57 | 0.12 | |

What is claimed is:

1. A polymer composition comprising
   (a) a base polymer which is a poly(alkyl(meth)acrylate); and
   (b) a rubber toughening agent selected from the group consisting of
      (i) copolymers of (alkyl)acrylate rubbers
      (ii) copolymers of vinyl aromatic monomers with (alkyl)acrylates
      (iii) copolymers of vinyl aromatic monomers with conjugated diolefins
      (iv) copolymers of vinyl aromatic monomers with monoethylenically unsaturated monomers
   wherein the rubber toughening agent is present in the polymer composition as discrete islands substantially surrounded by the base polymer and in which islands are sub-islands of the base polymer.

2. A polymer composition as claimed in claim 1 where the base polymer contains an alkylmethacrylate.

3. A polymer composition as claimed in claim 1 where the base polymer is a copolymer of an alkyl methacrylate and an alkyl acrylate.

4. A polymer composition as claimed in claim 3 where the base polymer is a copolymer of a $C_1$–$C_4$ alkyl methacrylate and a $C_1$–$C_4$ alkyl acrylate.

5. A polymer composition as claimed in claim 4 where the base polymer is a copolymer of methyl methacrylate and ethyl acrylate.

6. A polymer composition as claimed in claim 1 where the rubber toughening agent represents from 1 to 20% by weight of the polymer composition.

7. A polymer composition as claimed in claim 1 where the rubber toughening agent represents from 1 to 10% by weight of the polymer composition.

8. A polymer composition as claimed in claim 1 where the copolymers of (alkyl)acrylate and copolymers of vinyl aromatic monomers with (alkyl)acrylates incorporate allyl unsaturation.

9. A polymer composition as claimed in claim 8 where the level of allyl unsaturation is between 1.5 to 5.0% on a molar basis.

10. A polymer composition as claimed in claim 1 where the rubber toughening agent comprises a copolymer of (alkyl)acrylate rubbers.

11. A polymer composition as claimed in claim 1 where the rubber toughening agent comprises a copolymer of a vinyl aromatic monomer with a conjugated diolefin.

12. A polymer composition as claimed in claim 11 where the rubber toughening agent is a stryene-butadiene rubber copolymer.

13. A polymer composition as claimed in claim 1 where the islands of rubber toughening agent have an average particle sizes of between 0.01 and 250 microns in diameter.

14. A process for the preparation of a polymer composition comprising
   (a) a base polymer which is a poly(alkyl(meth)acrylate); and
   (b) a rubber toughening agent selected from the group consisting of
      (i) copolymers of (alkyl)acrylate rubbers
      (ii) copolymers of vinyl aromatic monomers with (alkyl)acrylates
      (iii) copolymers of vinyl aromatic monomers with conjugated diolefins
      (iv) copolymers of vinyl aromatic monomers with monoethylenically unsaturated monomers
   wherein the rubber toughening agent is present in the polymer composition as discrete islands substantially surrounded by the base polymer and in which islands are sub-islands of the base polymer which process comprises dissolving the rubber toughening agent in a monomer composition from which the base polymer is to be formed to form a solution, polymerising the monomer composition to form the base polymer and thereby causing the rubber toughening agent to come out of solution so as to form islands within the polymer composition in which are included sub-islands of the base polymer.

15. A process for the preparation of a polymer composition as claimed in claim 14 where a level of shear between 100 and 250 rpm is applied during the initial stages of polymerisation.

16. A moulded article formed from a polymer composition comprising
   (a) a base polymer which is a poly(alkyl(meth)acrylate); and
   (b) a rubber toughening agent selected from the group consisting of
      (i) copolymers of (alkyl)acrylate rubbers
      (ii) copolymers of vinyl aromatic monomers with (alkyl)acrylates
      (iii) copolymers of vinyl aromatic monomers with conjugated diolefins
      (iv) copolymers of vinyl aromatic monomers with monoethylenically unsaturated monomers
   wherein the rubber toughening agent is present in the polymer composition as discrete islands substantially surrounded by the base polymer and in which islands are sub-islands of the base polymer.

17. A moulded article formed from a polymer composition as claimed in claim 16 where the islands of rubber toughening agent have particle sizes of average diameter less than 5 microns.

18. A moulded article formed from a polymer composition as claimed in claim 16 where the islands of rubber toughening agent have particle sizes of average diameter 0.01 to 3 microns.

19. A moulded article formed from a polymer composition as claimed in claim 17 where the islands of rubber toughening agent have particle sizes of average diameter 0.01 to 3 microns.

* * * * *